United States Patent

[11] 3,588,485

[72] Inventor Gilbert R. Grado
17611 Orange Tree Lane, Tustin, Calif. 92680
[21] Appl No 800,874
[22] Filed Feb. 20, 1969
[45] Patented June 28, 1971

[54] RATE RESOLVER WHICH ACCEPTS AN ANGULAR RATE INPUT AND PRODUCES A SINUSOIDAL OUTPUT
5 Claims, 4 Drawing Figs.

[52] U.S. Cl. ............................................ 235/186, 235/189
[51] Int. Cl. ......................................... G06g 7/22
[50] Field of Search ............................... 235/186, 189, 190, 191, 192, 197, 150.26, 150.27

[56] References Cited
UNITED STATES PATENTS

| | | | |
|---|---|---|---|
| 2,879,002 | 3/1959 | Longerich | 235/186 |
| 2,995,302 | 8/1961 | Ingwerson et al. | 235/189X |
| 3,180,977 | 4/1965 | Brackel | 235/190X |
| 3,185,827 | 5/1965 | Herndon | 235/197 |
| 3,264,451 | 8/1966 | Faxen et al. | 235/189X |
| 3,358,127 | 12/1967 | Dolan | 235/186X |
| 3,371,199 | 2/1968 | Schwartzenberg et al. | 235/189 |
| 3,473,011 | 10/1969 | Schmid | 235/186X |

Primary Examiner—Malcolm A. Morrison
Assistant Examiner—Joseph F. Ruggiero
Attorney—White and Haefliger ABSTRACT: The disclosure concerns an electronic rate resolver of unusually advantageous construction and foolproof mode of operation and which accepts input representative of an angular rate $d\Phi/dt$ and produces sine $\Phi$ and cosine $\Phi$ sinusoidal output.

INVENTOR.
GILBERT R. GRADO
BY White & Haefliger
Attorneys.

INVENTOR.
GILBERT R. GRADO
By White & Haefliger
ATTORNEYS.

3,588,485

RATE RESOLVER WHICH ACCEPTS AN ANGULAR RATE INPUT AND PRODUCES A SINUSOIDAL OUTPUT

BACKGROUND OF THE INVENTION

This invention relates generally to computing equipment, and more specifically concerns electronic rate resolvers for use in such equipment.

Rate resolvers are useful in computing systems to provide one or more outputs that depend upon one of more inputs. For example, the simulation of three dimensional, six degree of freedom systems usually requires the use of accurate coordinate transformation so that rectangular-to-polar and polar-to-rectangular conversions may be effected with a high degree of precision and reliability.

Present resolvers suffer from certain disadvantages, among which are undesirable complexity as well as ambiguities at switching points. For example, in a typical problem in simulation, the input angular rate ($d\Phi/dt$) can be a randomly varying signal, and a logic signal is developed when $\Phi$ has reached $\pi/2$ or $-\pi/2$ radians to toggle a flip-flop controlling the inputs to sine or cosine generators. It is found that ambiguity can result when $d\Phi/dt$ reverses direction immediately after the flip-flop has toggled at the switching point, the circuit then being unable to reverse direction.

SUMMARY OF THE INVENTION

It is a major object of this invention to provide an unusually effective and reliable rate resolver characterized by the following features and advantages: the rate resolver accepts an input representative of an angular rate $d\Phi/dt$ and produces sine $\Phi$ and cosine $\Phi$ sinusoid generation outputs the sinusoid functions appear as a continuous wave, even though the angle $\Phi$ passes through more than one cycle; and the rate resolver accepts an extremely wide range of rate inputs. Whereas conventional electronic rate resolvers can yield erroneous results under some input signals, the rate resolver mentioned here offers completely foolproof operation for all input signals.

Basically, the invention is embodied in a resolver that includes sine $\Phi$ and cosine $\Phi$ generators; and means responsive to $d\Phi/dt$ inputs of opposite polarity and to a reference voltage to supply to the generators $-\Phi$ and $-\pi/2+|\Phi|$ inputs as $\Phi$ varies through $n\pi/2$ radians, where $n$ is greater than 1, thereby to form a sinusoid function over the angular range. As will appear, the supply means may advantageously include a $d\Phi/dt$ integrator, and a first switch to control transmission to the integrator of $d\Phi/dt$ signals of opposite polarity, logic circuitry typically effecting operation of the first switch when $\Phi$ reaches $\pi/2$ radians thereby to reverse the polarity of the $d\Phi/dt$ input to the integrator.

Further, the supply means referred to may advantageously include multiple channels connected in parallel between the integrator and the cosine generator, one channel to supply $-\Phi$ input to the generator, a second channel to supply $-\pi/2$ input to the cosine generator and a third channel to supply $2\Phi$ input to the cosine generator when $\Phi$ lies between the limits 0 to $\pi$ radians. As will appear, the supply means may also include a second switch operatively connected in a fourth channel to control transmission to the cosine generator of an input equivalent to the sum of the inputs of channels one, two and three multiplied by a factor of $-2$, logic circuitry effecting operation of the second switch when $\Phi$ reaches the $\pi/2$ and $-\pi/2$ limits.

A further aspect of the invention concerns the provision of logic circuitry comprising a flip-flop (or equivalent) the outputs of which are connected to the mentioned switches, and multiple comparators to monitor the polarity of $\Phi$ and the arrival of $\Phi$ at the limits of $\pi/2$ and $-\pi/2$, and gates operatively connected between the comparators and flip-flop, as will be described. Further, an additional comparator may be provided, with unusual advantage, to monitor $d\Phi/dt$ and to provide certain output logic signals when $d\Phi/dt$ is within a range corresponding to a predetermined small percentage of full scale, together with an auxiliary gate to operate the flip-flop in response to reception of those certain output logic signals and the output of that comparator monitoring the arrival of $\Phi$ at the limits $\pi/2$ and $-\pi/2$, all for the purpose of preventing ambiguity development, as will appear.

These as well as other objects and advantages of the invention, as well as the details of an illustrative embodiment, will be more fully understood from the following detailed description of the drawings, in which:

DESCRIPTION OF PREFERRED EMBODIMENTS

Figure 1:
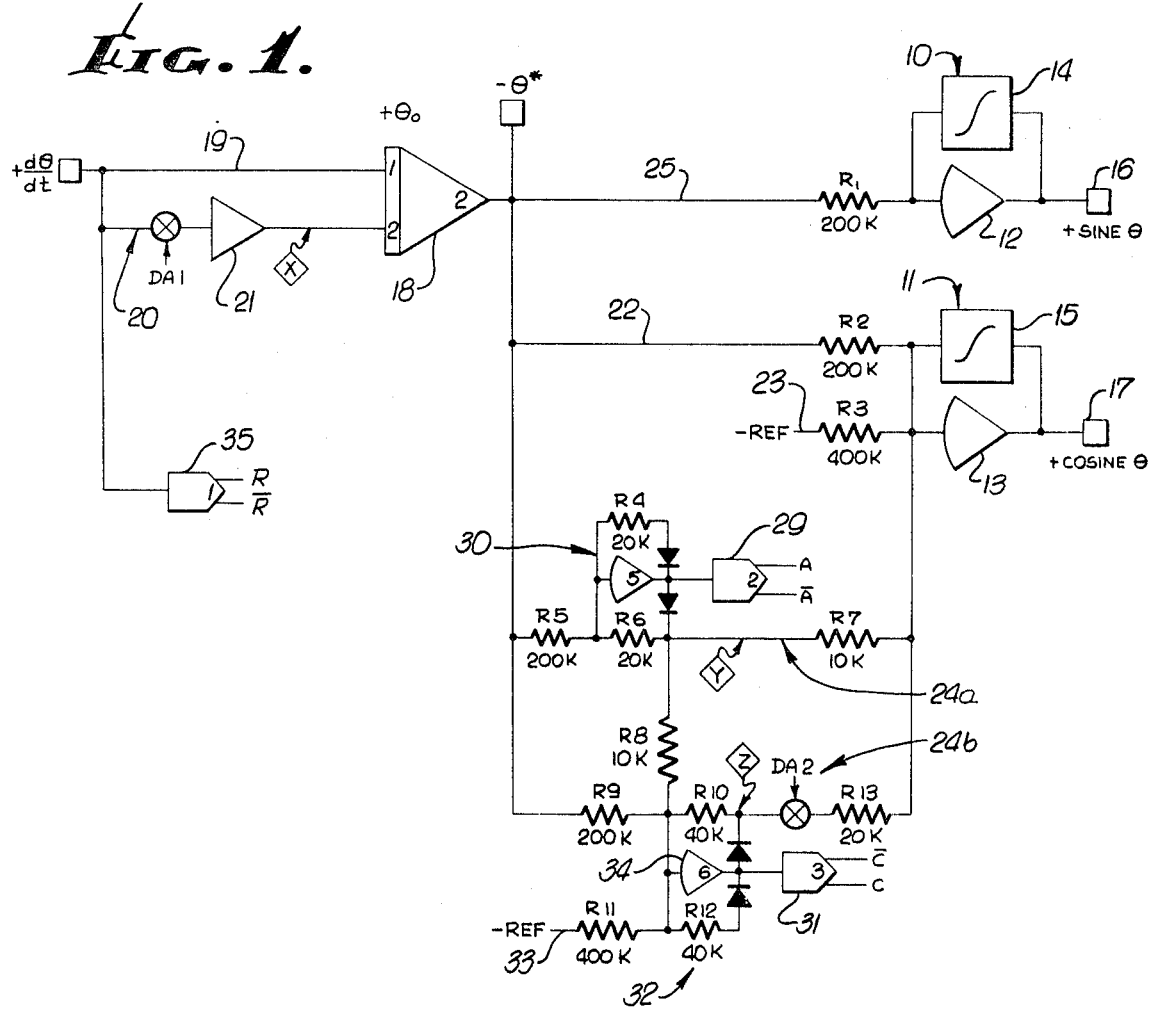
FIG. 1 is a block diagram of one preferred form of the rate resolver.

FIG. 1 illustrates, generally, sine $\Phi$ and cosine $\Phi$ generators 10 and 11 incorporating amplifiers 12 and 13 and feedback circuitry in blocks 14 and 15. The latter represent networks of diodes and resistors such as will effect production of the sinusoid functions at the outputs 16 and 17 of the generators, as for example over the $\Phi$ range $\pm\pi/2$ radians or $\pm 90°$.

The circuitry to the left of the generators may be characterized as one form of means responsive to $d\Phi/dt$ (i.e. rate of change of $\Phi$) inputs of opposite polarity, and to reference voltage, to supply to the generators $-\Phi$ and $-\pi/2-|\Phi|$ inputs, as $\Phi$ varies through $n\pi/2$ radians where $n$ is greater than 1, defining a wide range of $\Phi$ variance.

Figure 3:
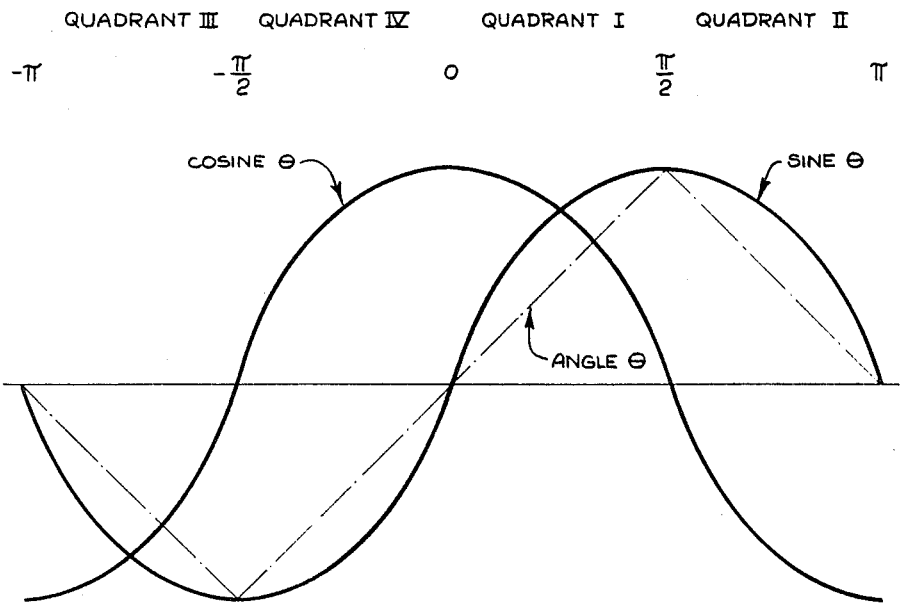
FIG. 3 illustrates sine and cosine output wave forms as related to the generated angle.

The supply means referred to typically includes a $d\Phi/dt$ integrator 18 and a first switch DA1 to control transmission to the integrator of $d\Phi/dt$ signals of opposite polarity. For example, $d\Phi/dt$ input may be supplied to the integrator on channel 19, whereas when switch DA1 is closed, $-2d\Phi/dt$ input is supplied to the integrator via channel 20 (which includes inverting amplifier 21), whereby the net input to the integrator is the signal $-d\Phi/dt$. When switch DA1 is open, only $+d\Phi/dt$ reaches the integrator. As will appear, the logic control of switch DA1 is such that the output of amplifier 21 is as follows:

0 for $-\pi/2 < \Phi < \pi/2$ (1)
$-d\Phi/dt$ for $\pi/2 < \Phi < -\pi/2$ (2)

where $\Phi$ is an angle within the bounds of $\pm\pi$ radians, as for example indicated in FIG. 3.

The output $-\Phi^*$ of the integrator 18 is as follows:

$\Phi^* = \Phi$ for $-\pi/2 < \Phi < \pi/2$ (3)
$\Phi 8 = \pi - \Phi$ for $\pi/2 < \Phi < \pi$ (4)
$\Phi^* = -\pi - \Phi$ for $-\pi < \Phi < -\pi/2$ (5)

The illustrated supply means may also be considered to include multiple channels connected in parallel between the integrator 18 and the cosine generator; for example, one such channel 22 supplies $-\Phi$ input to the generator 11, a second channel 23 supplies $-\pi/2$ input to that generator, and a third channel 24a supplies $+2\Phi$ input to that actuator when $\Phi$ lies between the limits 0 and $\pi$. A fourth channel 24b supplies an inverted signal equivalent to twice the sum of the other cosine generator inputs when $\Phi$ lies between $\pi/2$ and $\pi$, and the limits $-\pi/2$ and $-\pi$. The effect of channel 24b is to reverse the polarity of the cosine function when $\Phi$ lies between the limits $\pi/2$ and $\pi$, and the limits $-\pi/2$ and $-\pi$. Another channel 25 supplies $-\Phi$ input to the sine generator 10, as shown.

Channels 24a and 24b contain resistors $R_5$, $R_6$, $R_7$, $R_9$, $R_{10}$, and $R_{13}$ as indicated, with the signal at $Y$ in 24a equal to:

$Y = \Phi$ for $0 < \Phi < \pi/2$ (6)
$Y = (\pi-)$ for $\pi/2 < \Phi < \pi$ (7)
$Y = 0$ for $-\pi < \Phi < 0$ (8) The output at $Z$ in 24b is equal to:
$Z = 2(\pi/2 - \Phi)$ for $0 < \Phi < \pi/2$ (9)
$Z = 2(-ab/2 + \Phi)$ for $\pi/2 < \Phi < \pi$ (10)
$Z = 2(-ab/2 - \Phi)$ for $-\pi < \Phi < -\pi/2$ (11)
$Z = 2(\pi/2 + \Phi)$ for $-\pi/2 < \Phi < 0$ (12)

The output Y from channel 24a is supplied as Φ varies in all four quadrants, whereas the output Z is supplied only as Φ varies in quadrants II and III, due to the switching action of DA2 in channel 24b, as will be described.

Figure 4:
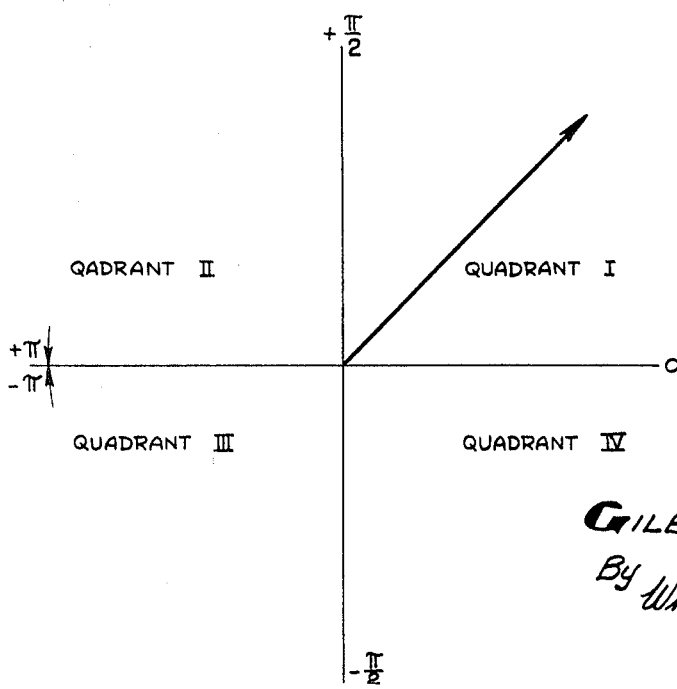
FIG. 4 is a vector diagram.

The input to amplifier 13 in Quadrant II is: $(-\pi/2-\Phi^*)-2Y+Ax[-\pi/2-(\pi a I\Phi)]+2(\pi-\Phi)+2(-\pi/2+\Phi)=-\pi/2+\Phi$ (13) The output of amplifier 13 is the inverted sine function of the input angle. Therefore, its output is $-\sin(-\pi/2\Phi)$, or cosine (Φ). In Quadrant III the input to amplifier 13 is: $(-\pi/2-\Phi^*)+Y+ZAx(-\pi/2+\pi+)+2\Phi+2(-\pi/2-\Phi)=-\pi/2+\Phi$ (14) The output of amplifier 13 in Quadrant III is equal to the sine $(\pi/2+)$ or cosine (Φ). The net result is that the sine and cosine functions appear to be continuous as determined by the input angular rate, even though the generated angle Φ* is restricted to the bounds of $\pm\pi$ radians. In effect, in FIG. 4, a rotating vector will operate only in Quadrants I and IV, but the outputs indicate operation in all four quadrants.

Another aspect of the invention concerns the provision of logic circuitry to effect operation of switch DA1 when Φ reaches $\pi/2$ radians, thereby to reverse the polarity of the $d\Phi/dt$ input to the integrator 18; and logic circuitry to effect operation of switch DA2 when Φ reaches the $\pi/2$ and $-\pi/2$ limits. As will be seen, the logic circuitry may advantageously include a flip-flop having outputs operatively connected to the switches DA1 and DA2, and multiple comparators monitoring certain parameters and controlling the state of the flip-flop via gates.

Figure 2:
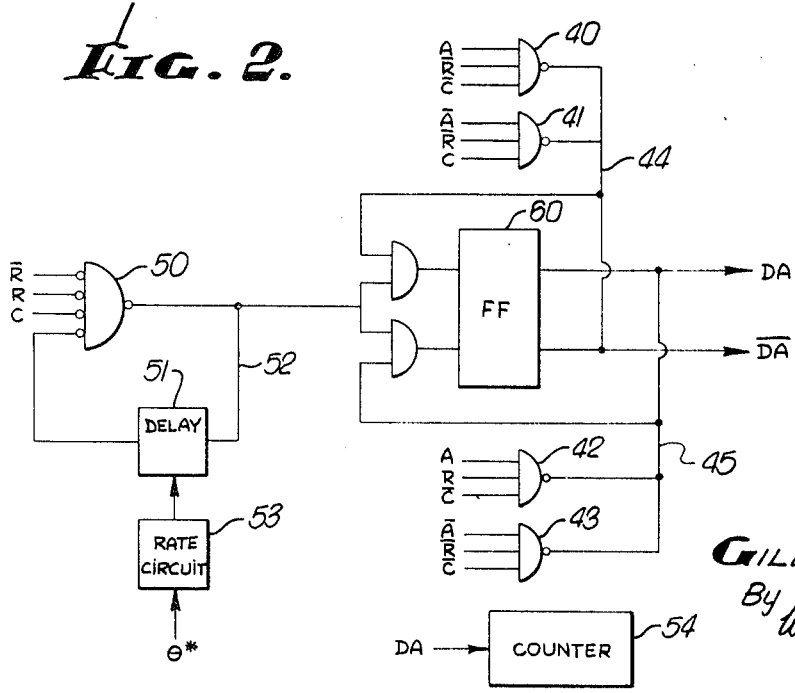
FIG. 2 is a block diagram of the control logic for the FIG. 1 resolver.

As seen in FIGS. 1 and 2, a first comparator 29 is connected with the Φ output of the integrator 18 via resistor, diode and amplifier network 30, and monitors the polarity of Φ. Thus, the logic signal output of the comparator (A) is true if Φ is positive, and false, if Φ is negative. The complementary output (Ā) is true when Φ is negative and false if Φ is positive. A second comparator 31 is connected via the illustrated resistor, diode and amplifier network 32 with the Φ output of the integrator and with a reference voltage source 33, and monitors the arrival of Φ at the limits $\pi/2$ and $-\pi/2$. For example, the logic signal output of the comparator 31 (C) will go true upon arrival of the integrator output voltage at +50 volts or −50 volts in the case where those voltages are selected to represent $\pi/2$ and $-\pi/2$ respectively. It is understood that other voltages may be used. In this regard, switch DA2 is closed when Φ is between $\pi/2$ and $\pi$, and between $-\pi/2$ and $-\pi$, and the circuit of channel 24b, including amplifier 34, then drives the output of the cosine generator in the negative direction.

A third or auxiliary comparator 35 is provided to monitor the polarity of $d\Phi/dt$ for furnishing certain output logic signals. The logic output R is true if the rate is positive, and false if the rate is negative. The logic output R̄ is true for negative rates and false for positive rates. The comparator has the feature that both logic outputs are false for $d\Phi/dt$ input levels less than 0.01 percent of full scale; for a 100-volt analog computer system, comparator 35 would have its output logic signals false for rate inputs less than 10 millivolts. This compensates for the effects of integrator drift, and comparator imperfection. For example, if the comparator indicates a positive $d\Phi/dt$ rate and the integrator drifts in the direction caused by negative rate, the resolver could go into a lockup condition, in the absence of such compensation. The 10 millivolt "deadzone" assures that the comparator and integrator will always be in agreement, as further described below.

Referring to FIG. 2, the four NAND gates 40, 41, 42 and 43 are connected at 44 and 45 to directly set or reset the flip-flop, depending on the logic input to the gates, such inputs indicated as A, Ā, R, R̄, C and C̄. For example, if the flip-flop is initially reset, and then if the angle reaches $\pi/2$ radians (C goes true), the angle is positive (A is true), and the rate is positive (R is true), the result is that gate 42 will set the flip-flop. With the flip-flop set, the DA switches (DA1 and DA2) will close, causing the input to the integrator 18 to reverse and switching the polarity of the cosine function. Gate 43 will set the flip-flop if the rate is negative, the angle is negative, and the angle has reached $-\pi/2$ radians. Gate 41 will reset the flip-flop if the rate is positive, the angle negative, and the angle has reached $-\pi/2$ radians. Gate 40 will reset the flip-flop if the rate is negative, the angle is positive, and the angle has reached $+\pi/2$ radians.

An auxiliary gate 50 operates the flip-flop 60 in response to output signals R, R̄ and C, as indicated in FIG. 2. For example, for signals less than 10 millivolts gate 50 is used to toggle the flip-flop if both R and R̄ are false, the angle has reached $\pm\pi/2$ radians (C is true and C is false), and a delay circuit 51 is not inhibiting gate 50. The change of state of gate 50 will automatically activate the delay circuit, as via line 52. The delay is inversely proportional to the time derivative of the angle, and typically, the delay ranges from 5 milliseconds to 0.5 seconds to cover the range of integrating time constants from 10 to 0.001 seconds. The use of this technique for small rates is greatly simplified over the conventional rate resolver, because the range of rate inputs is restricted to the bounds of 0.01 percent of full scale, typically.

The deadzone of the comparator can be set to other values, depending on the drift characteristics of the integrator and offset characteristics of the comparator. Rate circuit 53 consists of a differentiator which generates a voltage proportional to the absolute value of the angular rate.

It should be observed that whenever the rate input, $(d\Phi/dt)$ is greater than 0.01 percent, the rate comparator 35 generates a logic signal (either R is true, or R̄ is true) that controls the inputs to the four gates (40, 41, 42, 43) in a straightforward manner. The flip-flop 50 has to react immediately to the requests of the gates, and the direction that the flip-flop is going is the right way because we know where we are (the angle comparator), where we are going (the rate comparator), and the need to change states (the $\pi/2$ limit comparator). In the very small area (0.01 percent) where the input rate is not well established, the resolver has the advantage that even if the rate changes direction, it cannot go very far, because as it exceeds 0.01 percent of the full scale signal, the direct circuits will take over again. Within the realm of the input signal staying within 0.01 percent, the flip-flop will toggle. The use of the rate circuit and the delay circuit assures that the resolver will operate without error in this small region. Outside of this range (which is 9,999 parts out of 10,000) the operation is completely foolproof.

In summary, the rate resolver described herein offers completely foolproof operation for all combinations of input angular rates. The resolver has no restrictions on the number of revolutions through which the angle may rotate. A logic signal is available DA to drive a counter, as at 54, to keep track of the number of revolutions. Being an all-electronic device, it is not restricted in speed except for the error generated in the amplifiers and associated networks. The ohmic values of the resistors in FIG. 1 are representative only, and other values may be used so long as the mode of operation remains.

I claim:

1. In a resolver,
A. sine Φ and cosine Φ generators and
B. means responsive to $d\Phi/dt$ inputs of opposite polarity and to reference voltage to supply to the generators −Φ and $-\pi/2az\Phi$ inputs as Φ varies through $m\Phi/2$ radians where $n$ is greater than 1, said means including a $d\Phi/dt$ integrator, a first switch to control transmission to the integrator of $d\Phi/dt$ signals of opposite polarity, logic circuitry to effect operation of said first switch when Φ reaches $\pm\pi/2$ radians thereby to reverse the polarity of the $d\Phi/dt$ input to the integrator, multiple channels connected in parallel between the integrator and the cosine generator, one channel to supply −Φ input to the generator, a second channel to supply $-\pi/2$ input to the cosine generator, and a third channel to supply $-2\Phi$ input to the cosine generator when Φ lies between the limits O and $\pi$, a second switch operatively connected in a fourth channel to control transmission to the cosine generator of inputs resulting in a phase reversal of the cosine function between the limits $\pi/2$ and $\pi$, and the limits $-\pi/2$ and $-\pi$, and logic circuitry to effect operation of said second switch when $\Phi$ reaches said $\pi/2$ and $-\pi/2$ limits.

2. The resolver of claim 1 wherein said logic circuitry includes a flip-flop the outputs of which are operatively connected to said switches, multiple comparators to monitor the polarity of $\Phi$ and the arrival of $\Phi$ at the limits $\pi/2$ and $-\pi/2$, and gates operatively connected between said comparators and flip-flop.

3. The resolver of claim 2 wherein said logic circuitry includes an additional comparator to monitor $d\Phi/dt$ and providing output logic signals indicative of the polarity of the input rate $d\Phi/dt$ for controlling the status of said switches.

4. The resolver of claim 3 wherein said comparator generates certain output logic signals when $d\Phi/dt$ is within a range corresponding to a predetermined small percentage of full scale and said logic circuitry includes an auxiliary gate to operate the flip-flop in response to reception of said certain output signals and the output of the comparator monitoring the arrival of $\Phi$ at the limits $\pi/2$ and $-\pi/2$.

5. The resolver of claim 3 including circuitry to inhibit said auxiliary gate when $d\Phi/dt$ is outside said range and to enable said gate when $d\Phi/dt$ is within said range.